Nov. 27, 1956  C. R. SHORT ET AL  2,771,785
MECHANICAL MOVEMENT
Filed June 3, 1952  2 Sheets-Sheet 1
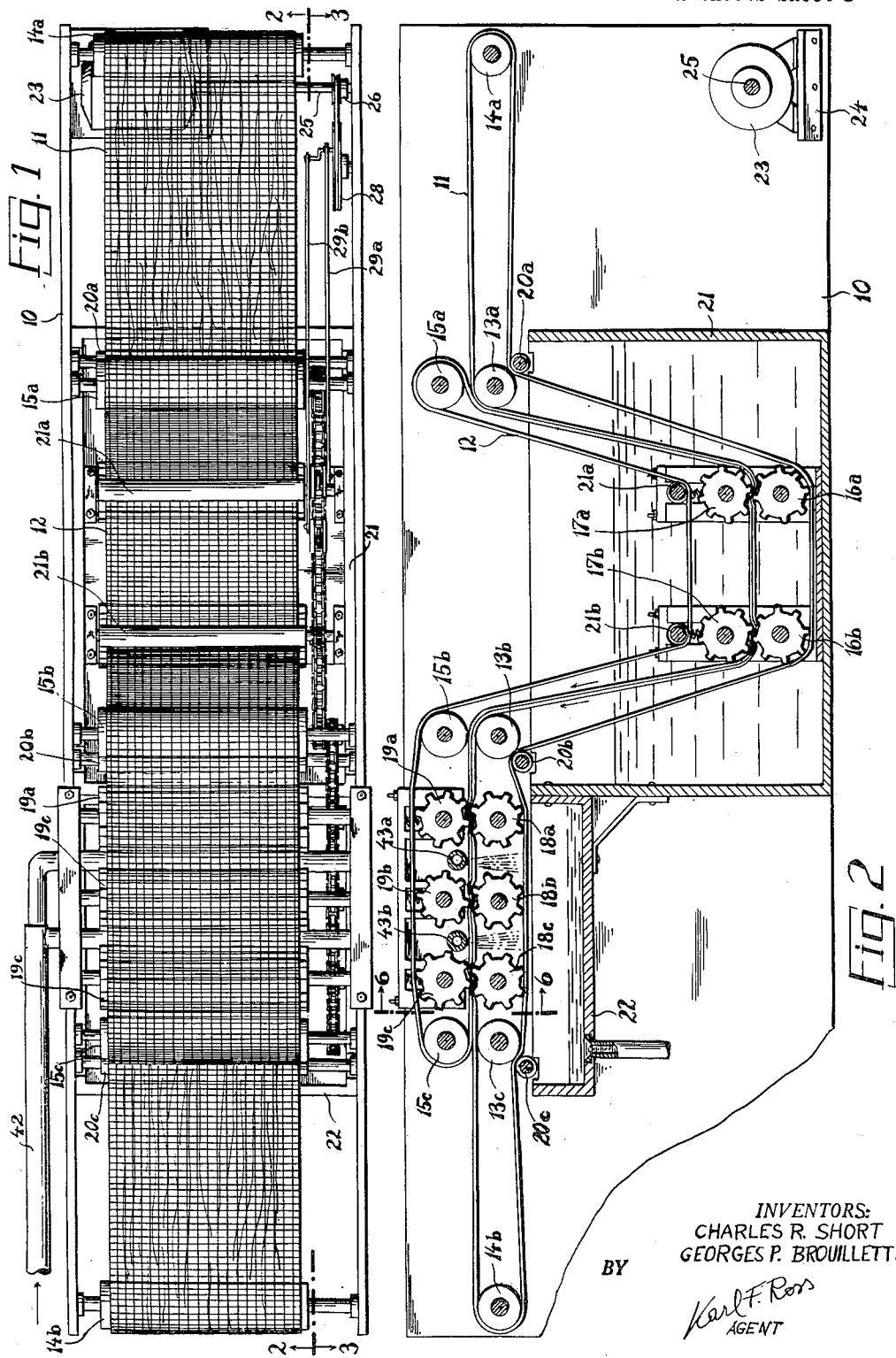
INVENTORS:
CHARLES R. SHORT
GEORGES P. BROUILLETTE
BY
Karl F. Ross
AGENT

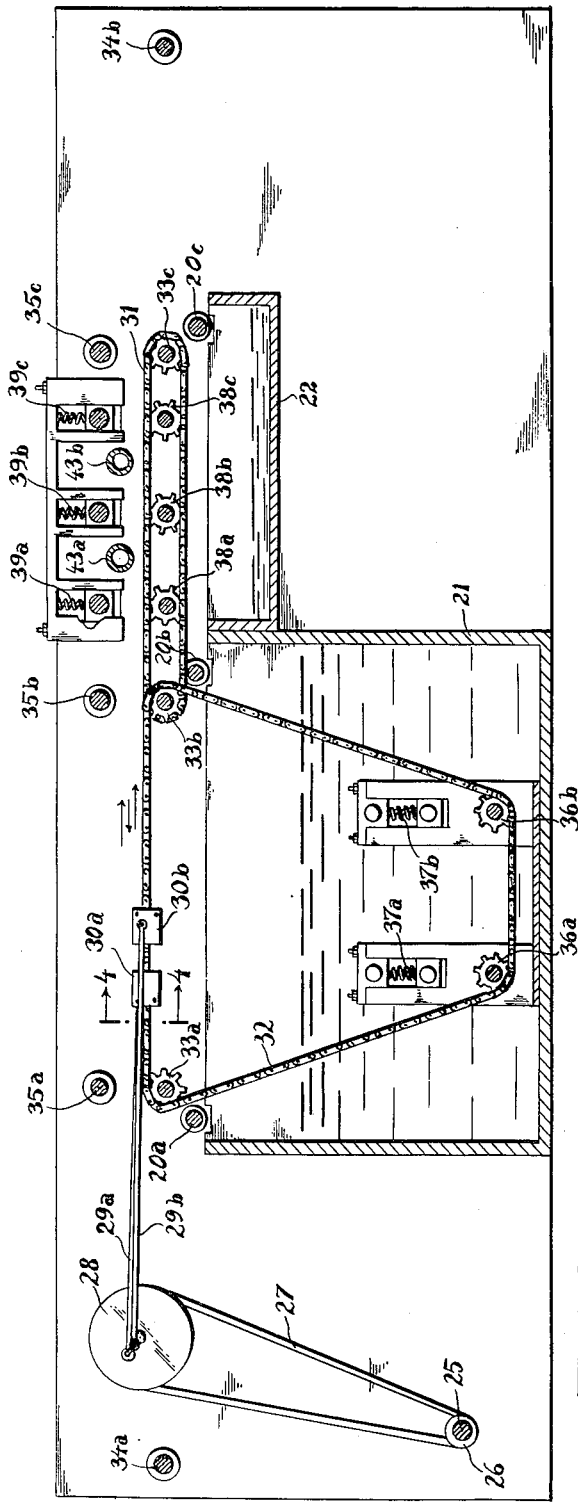
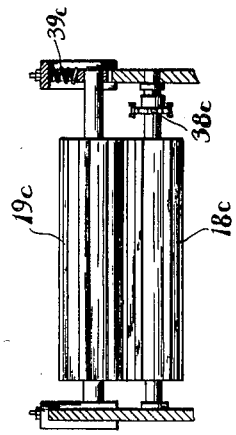
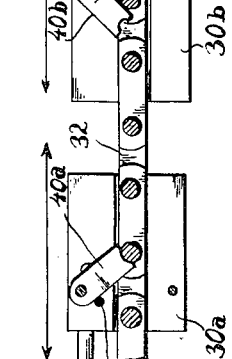
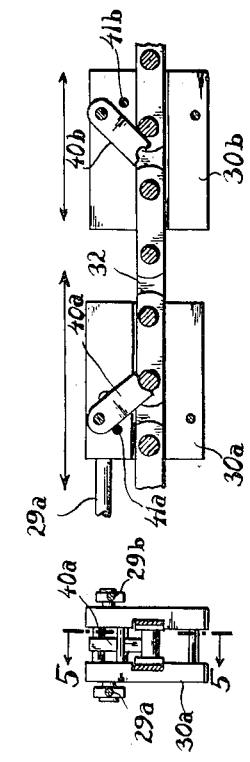
Nov. 27, 1956    C. R. SHORT ET AL    2,771,785
MECHANICAL MOVEMENT
Filed June 3, 1952    2 Sheets-Sheet 2
INVENTORS:
CHARLES R. SHORT
GEORGES P. BROUILLETTE
BY
AGENT

United States Patent Office 2,771,785
Patented Nov. 27, 1956

2,771,785
MECHANICAL MOVEMENT

Charles R. Short and Georges P. Brouillette, Clermont, Fla., assignors to Florida Industrial Laboratory, Inc., Clermont, Fla.

Application June 3, 1952, Serial No. 291,502

1 Claim. (Cl. 74—166)

Our present invention relates to an apparatus for the degumming of vegetable fibers, notably (but not exclusively) those of ramie (China grass) and related plants.

An important object of our invention is to provide improved means for importing progressive reciprocating motion to an apparatus for degumming fibers in a single, continuous, assembly-line-type process in which the raw fibers are introduced into the treatment plant at one end and the processed fibers are removed therefrom at the other end.

The use of so-called progressive reciprocating motion in an apparatus of the aforementioned type enables the thorough maceration of the fibers with a minimum amount of treatment liquor, the reciprocating component of this motion insuring agitation of the fibers in the bath at a rate which is high compared with their net rate of advance through the apparatus.

It is convenient to use a conveyor system, driven by an endless chain, for advancing the fibers through the treatment bath. A more specific object of our invention, therefore, is the provision of means for imparting progressive reciprocating motion directly to a driving chain. This is accomplished, in accordance with the present invention, by two pawls engaging the chain from opposite directions, said pawls being driven by respective cranks of different eccentricity whereby larger forward steps and smaller backward steps are alternately imparted to the chain.

The foregoing and other objects and features of the invention will become more fully apparent from the following detailed description of a now preferred embodiment, reference being had to the accompanying drawing in which:

Fig. 1 is a top plan view of a degumming apparatus according to the invention;

Figs. 2 and 3 are elevations, partly in section on the lines 2—2 and 3—3, respectively, of Fig. 1;

Fig. 4 is a detail view of part of the actuating mechanism, drawn to a larger scale;

Fig. 5 is a section taken on the line 5—5 of Fig. 4; and

Fig. 6 is a section taken on the line 6—6 of Fig. 2.

The apparatus shown in the drawing comprises a frame 10 on which there are mounted various rollers for the support and the advance of two synchronously moving webs 11, 12 (consisting, for example, of ramie fibers) and for the maceration of fibers initially placed on the lower web 11, the latter projecting for a substantial distance beyond the upper web 12 on both the input end (right, as viewed in Figs. 1 and 2) and the output end (left, as viewed in these figures) of the apparatus. These rollers include three positively driven feed rollers 13a, 13b, 13c; two smooth-surfaced idler rollers 14a, 14b for the web 11; three smooth-surfaced idler rollers 15a, 15b, 15c for the web 12, co-operating with the rollers 13a, 13b, 13c, respectively; two positively driven working rollers 16a, 16b for macerating the fibers in the degumming liquor, having axially grooved or corrugated surfaces; two non-driven pressure rollers 17a, 17b having corrugations meshing with those of the rollers 16a, 16b, respectively; three positively driven, similarly corrugated working rollers 18a, 18b, 18c for lacerating the fibers in the washing section of the apparatus; and three non-driven pressure rollers 19a, 19b, 19c having corrugations meshing with those of the rollers 18a, 18b, 18c, respectively. In addition, auxiliary idler rollers 20a, 20b, 20c support the web 11 from below and co-operate with the rollers 13a, 13b, 13c, respectively. It will be understood that each of these sets of rollers may be representative of a number of rollers different from, and possibly much larger than, the number actually shown.

A vat or tank 21 contains the degumming liquor, e. g. a suitable alkaline solution, and is provided with internal supports for the mounting of the rollers 16a, 16b and 17a, 17b. Adjacent the tank 21, toward the output end of the machine, there is positioned a sink 22 which forms part of the washing section of the degummer. The advance of the fibers from the input end to the output end is effected by a motor 23, mounted on a bracket 24, which drives a main shaft 25 forming part of a mechanism imparting a reciprocating progressive motion to the positively driven rollers 13a, 13b, 13c, 16a, 16b and 18a, 18b, 18c.

The motion-imparting mechanism comprises a first pulley 26 on shaft 25, a belt 27, and a pulley 28 driven by the belt from pulley 26. Two rods 29a, 29b are secured to the disk of pulley 28 at points of different eccentricity, whereby a carriage 30a pivotally connected with the other end of rod 29a, and straddling a chain 32, will carry out a larger reciprocating motion than a carriage 30b similarly connected with the other end of rod 29b and riding on the same chain. Thus, as indicated by the arrows in Fig. 5, the swing of the carriages 30a, 30b may correspond to approximately three links and two links, respectively, of the chain 32. This chain passes around sprockets 33a, 33b and 36a, 36b, mounted on the shafts of positively driven rollers 13a, 13b and 16a, 16b, respectively; a companion chain 31 passes around sprockets 38a, 38b, 38c and 33c, mounted on the shafts of rollers 18a, 18b, 18c and 13c, respectively, and also engages another set of teeth on sprocket 33b whereby the two chains are coupled for synchronous movement.

Each of the carriages 30a, 30b has a dog 40a, 40b, respectively, and a backstop 41a, 41b for this dog. These backstops are so arranged that the dog 40a will engage a link of chain 32 only during forward movement of the carriage 30a (to the right in Figs. 3 and 5) whereas the dog 40b will engage such a link only during backward movement of the carriage 30b. The resulting motion represents a succession of reciprocations superimposed upon a progressive forward movement, as symbolized by the arrows of different length in Fig. 3.

Fig. 3 also shows the shafts of idler rollers 14a, 14b and 15a, 15b, 15c at 34a, 34b and 35a, 35b, 35c. The figure further shows springs 37a, 37b and 39a, 39b, 39c which engage the shaft bearings of the upper working rollers 17a, 17b and 19a, 19b, 19c, respectively, thereby applying said upper rollers resiliently against the associated positively driven working rollers 16a, 16b and 18a, 18b, 18c.

Water for the washing section is introduced from a suitable source, not shown, into a feeder pipe 42 and is delivered to sprinkler tubes 43a, 43b positioned between the upper working rollers 19a, 19b, 19c of this section.

In operation, as will be readily understood in the light of the foregoing, the raw fibers are placed on the web 11 at the input end of the machine, in at least roughly parallel position to one another and to the direction of feed, and are caught between the webs 11 and 12 on passing underneath roller 15a, i. e. before entering the degumming section of the apparatus. The fibers so engaged descend into the tank 21 and, after having become submerged in the degumming liquor, are macerated by the progressively reciprocating working rollers 16a, 17a and 16b, 17b. During their subsequent slow and oscillatory ascent from the bath a large path of the free liquor is shaken off and returns to the tank, this action being supplemented by the squeeze effect of the rollers 13b, 15b positioned at the exit of the degumming section. The fibers are then successively macerated by the pairs of working rollers 18a—19a, 18b—19b and 18c—19c; they are, moreover, thoroughly washed by water from the sprinklers 43a, 43b on passing from one pair of these rollers to the next. The excess water is squeezed out by the rollers 13c, 15c and reaches the sink 22 as the fibers leave the washing section; the treated and washed fibers may then be removed from the web 11 at the output end of the machine in substantially same relative position as that in which they had been placed thereon.

It will be understood that the system shown and described has been given merely by way of illustration, and that the invention is capable of various adaptations and modifications without thereby departing from the scope of the appended claim. In particular it may be noted that the invention, at least in its broader aspects, is not limited to a degumming process but may be applied to a variety of arrangements in which fibers or similar objects are treated in more or less analogous manner.

We claim:

In an apparatus for degumming vegetable fibres, the combination of a chain for driving a conveyor belt with mechanism for imparting progressive reciprocating motion to said chain, said mechanism including first and second crank means of different eccentricity, first and second pawl means engaging said chain from opposite directions, and link means connecting said first and second pawl means with said first and second crank means, respectively.

References Cited in the file of this patent

UNITED STATES PATENTS

| | | |
|---|---|---|
| 151,264 | Austin | May 26, 1875 |
| 573,936 | Turkington | Dec. 29, 1896 |
| 2,064,512 | Wilson | Dec. 15, 1936 |
| 2,074,599 | Todd | Mar. 23, 1937 |
| 2,552,078 | Williams | May 8, 1951 |
| 2,591,069 | Hodge | Apr. 1, 1952 |

FOREIGN PATENTS

| | | |
|---|---|---|
| 109,847 | Germany | Nov. 27, 1898 |